United States Patent
Cline et al.

(10) Patent No.: US 10,495,358 B2
(45) Date of Patent: Dec. 3, 2019

(54) BI-DIRECTIONAL CASCADE HEAT PUMP SYSTEM

(71) Applicant: TRANE INTERNATIONAL INC., Davidson, NC (US)

(72) Inventors: Lee R. Cline, West Salem, WI (US); Michael C. A. Schwedler, La Crosse, WI (US); Susanna S. Hanson, La Crosse, WI (US); Brian J. Fiegen, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 50 days.

(21) Appl. No.: 15/243,039

(22) Filed: Aug. 22, 2016

(65) Prior Publication Data

US 2016/0356531 A1 Dec. 8, 2016

Related U.S. Application Data

(63) Continuation of application No. 12/653,935, filed on Dec. 21, 2009, now Pat. No. 9,423,159.

(51) Int. Cl.
*F24F 5/00* (2006.01)
*F25B 30/06* (2006.01)
(Continued)

(52) U.S. Cl.
CPC ............ *F25B 30/06* (2013.01); *F24F 5/0046* (2013.01); *F25B 7/00* (2013.01); *F25B 29/003* (2013.01);
(Continued)

(58) Field of Classification Search
CPC ...... F25B 25/005; F25B 29/003; F25B 30/02; F25B 2600/05; F25B 2313/002;
(Continued)

(56) References Cited

U.S. PATENT DOCUMENTS 2,461,449 A * 2/1949 Smith .................... F25B 30/06
 62/260
2,797,068 A * 6/1957 McFarlan ................ F24F 3/10
 165/207

(Continued)

FOREIGN PATENT DOCUMENTS

CH 671622 A5 9/1989
DE 19950212 A1 4/2001
(Continued)

*Primary Examiner* — Christopher R Zerphey
*Assistant Examiner* — For K Ling
(74) *Attorney, Agent, or Firm* — Hamre, Schumann, Mueller & Larson, P.C.

(57) ABSTRACT

A multi-mode, bi-directional cascade heat pump system, according to some examples, includes at least two chillers each being part of a unidirectional refrigerant circuit. The system includes heat exchangers each of which are dedicated to operate as just a condenser or as just an evaporator, regardless of the system's operating mode. In some modes, a secondary fluid transfers heat between the condenser of one chiller and the evaporator of another chiller before the fluid returns to a secondary fluid source such as, for example, a geothermal borefield or a conventional water source. In some embodiments, fluid is withdrawn from a borefield by way of a pump having a speed that varies to maintain a desired fluid temperature and/or a desired heat transfer rate at the borefield. The heat pump system includes means for minimizing flow through the borefield and for minimizing unnecessary mixing of relatively high and low temperature fluid.

12 Claims, 14 Drawing Sheets

(51) Int. Cl.
*F25B 7/00* (2006.01)
*F25B 29/00* (2006.01)
*F25B 49/02* (2006.01)

(52) U.S. Cl.
CPC ...... *F25B 49/02* (2013.01); *F24F 2005/0057* (2013.01); *F25B 2313/002* (2013.01); *F25B 2400/06* (2013.01); *F25B 2600/13* (2013.01); *F25B 2700/21* (2013.01)

(58) Field of Classification Search
CPC .................. F25B 2400/06; F25B 30/06; F25B 2005/0053; F24F 5/0046; F24F 2005/0057; F24F 3/06; F24F 3/065; F24D 2200/11; F24D 11/0214; F24D 3/18; Y02B 10/40
USPC ..... 62/98, 117, 118, 238.7, 324.6, 333, 335, 62/434, 260, 238.6; 165/45, 100–103
See application file for complete search history.

(56) References Cited

U.S. PATENT DOCUMENTS

| | | | |
|---|---|---|---|
| 3,069,867 A * | 12/1962 | Ringquist | F24F 3/06 165/300 |
| 3,276,516 A * | 10/1966 | Japhet | F24F 5/0003 165/221 |
| 3,321,929 A * | 5/1967 | Little | F24F 5/00 165/201 |
| 3,322,188 A * | 5/1967 | Ostrander | F24F 5/00 165/64 |
| 3,378,062 A * | 4/1968 | Ringquist | F24F 3/08 165/221 |
| 3,675,441 A * | 7/1972 | Perez | F25B 1/00 62/278 |
| 3,782,132 A | 1/1974 | Lohoff | |
| 3,853,172 A * | 12/1974 | McFarlan | F24F 3/10 165/210 |
| 4,091,636 A | 5/1978 | Margen | |
| 4,144,722 A | 3/1979 | Mattwell | |
| 4,149,389 A | 4/1979 | Hayes et al. | |
| 4,171,621 A | 10/1979 | Trelease | |
| 4,285,392 A | 8/1981 | Rannow | |
| 4,325,357 A | 4/1982 | Wormser | |
| 4,335,580 A | 6/1982 | Hannett et al. | |
| 4,363,218 A | 12/1982 | Nussbaum | |
| 4,375,831 A | 3/1983 | Downing, Jr. | |
| 4,464,909 A | 8/1984 | Litzberg | |
| 4,466,256 A * | 8/1984 | MacCracken | F24F 5/0046 126/400 |
| 4,489,568 A | 12/1984 | Shapess | |
| 4,522,253 A * | 6/1985 | Levin | F24D 11/0214 165/207 |
| 4,633,676 A | 1/1987 | Dittell | |
| 4,753,285 A | 6/1988 | Rawlings | |
| 4,949,547 A * | 8/1990 | Shimizu | F24F 5/0003 62/238.7 |
| 5,081,848 A | 1/1992 | Rawlings et al. | |
| 5,394,935 A | 3/1995 | Glover | |
| 6,094,925 A * | 8/2000 | Arshansky | F25B 25/005 62/151 |
| 6,122,922 A | 9/2000 | Conner | |
| 6,233,951 B1 | 5/2001 | Cardill | |
| 6,453,686 B1 | 9/2002 | Alden | |
| 6,955,065 B2 | 10/2005 | Taylor et al. | |
| 3,726,682 A1 | 5/2014 | Olson | |
| 2003/0221436 A1 | 12/2003 | Xu | |
| 2005/0155753 A1* | 7/2005 | Goransson | F24D 11/0214 165/240 |
| 2008/0230205 A1 | 9/2008 | Seguin et al. | |

FOREIGN PATENT DOCUMENTS

| | | | |
|---|---|---|---|
| DE | 102004061441 | | 6/2006 |
| DE | 102008019878 A1 | | 10/2009 |
| EP | 1780476 A1 | | 5/2007 |
| JP | 2002310524 A * | 10/2002 | ............... F24J 3/081 |
| SE | 0801198 L | | 11/2009 |

* cited by examiner

BI-DIRECTIONAL CASCADE HEAT PUMP SYSTEM

BACKGROUND OF THE INVENTION

1. Field of the Invention

The subject invention generally pertains to refrigerant systems and more specifically to a cascade heat pump system.

2. Description of Related Art

Geothermal heat pump systems often include a refrigerant system that exchanges heat with the ground via a borefield or some other means. A borefield basically is a buried network of pipes through which a fluid is pumped. As the fluid flows through the borefield, the fluid exchanges heat with the surrounding ground, and the refrigerant system then uses the exchanged heat energy to help heat or cool a certain load.

Drawbacks of current geothermal heat pumps include limited operating modes, need for reversible refrigerant circuits, need for selectively operating a heat exchanger as a condenser and an evaporator, and/or unnecessary mixing of relatively high and low temperature fluid. Consequently, there is a need for a better heat pump system that is particularly useful in geothermal applications but also useful for more conventional water source systems.

SUMMARY OF THE INVENTION

It is an object of some embodiments of the invention to provide a heat pump system that avoids unnecessary mixing of relatively high and low temperature fluid.

Another object of some embodiments is to provide a wide selection of heating and/or cooling modes without having to reverse the refrigerant flow through a refrigerant circuit.

Another object of some embodiments is to provide a wide selection of heating and/or cooling modes without having to switch the operation of a heat exchanger between condensing and evaporating.

Another object of some embodiments to provide a heat pump system with multiple pumps, wherein the discharge of one pump leads to the inlet of another pump, which in turn can discharge fluid that leads to the inlet of yet another pump, wherein each pump can be sized to meet the needs of selected flow restrictions.

Another object of some embodiments is to provide a heat pump system with a secondary fluid source (e.g., a geothermal borefield) from which fluid is withdrawn by way of a pump having a speed that varies to maintain a desired fluid temperature and/or a desired heat transfer rate with the fluid source. An exchange of secondary fluid between the secondary fluid source and a fluid circulation loop (that includes a heat exchanger of a chiller) varies to meet the heating or cooling demand of the heat pump system, thus the flow rate of fluid from the fluid source can be less than or equal to the flow rate through the fluid circulation loop.

Another object of some embodiments is to transfer heat between the condenser of one chiller and the evaporator of another chiller by pumping fluid between the condenser and the evaporator prior to releasing the fluid to the fluid source.

In some embodiments, the present invention provides a heat pump system operable with a refrigerant and a secondary fluid. The heat pump system comprises a geothermal fluid source, a first chiller with a condenser, a second chiller with an evaporator, and a fluid circulation loop coupling the geothermal fluid source in heat transfer relationship with the first chiller and the second chiller such that the secondary fluid flows from the geothermal fluid source, then flows sequentially through the condenser and the evaporator (but not necessarily in that order), and then flows back to the geothermal fluid source.

In some embodiments, the present invention provides a heat pump system operable with a refrigerant and a secondary fluid. The heat pump system is selectively operable in a first priority mode and a second priority mode. The heat pump system comprises a geothermal fluid source, a refrigerant system that includes a compressor and a heat exchanger, a fluid circulation loop that couples the geothermal fluid source in heat transfer relationship with the heat exchanger, a first pump of variable speed connected in fluid communication with the geothermal fluid source and the fluid circulation loop, a first temperature sensor at a first location on the fluid circulation loop, and a second temperature sensor at a second location on the fluid circulation loop. The speed of the first pump varies in response to the first temperature sensor when the heat pump system is operating in the first priority mode. The speed of the first pump varies in response to the second temperature sensor when the heat pump system is operating in the second priority mode.

In some embodiments, the present invention provides a heat pump system operable with a refrigerant and a secondary fluid. The heat pump system comprises a first chiller that includes a first compressor and a first heat exchanger, wherein the first heat exchanger places the refrigerant in heat transfer relationship with the secondary fluid. The heat pump system further comprises a fluid circulation pump, a fluid circulation loop connecting the fluid circulation pump in circulating fluid communication with the first heat exchanger, and a loop segment within the fluid circulation loop. The loop segment includes an upstream loop point and a downstream loop point, wherein the terms, "upstream" and "downstream" are in reference to the secondary fluid flowing through the loop segment. The heat pump system further comprises a secondary fluid source coupled to the loop segment and a secondary fluid pump connected to force the secondary fluid between the secondary fluid source and the loop segment such that the secondary fluid flowing from the secondary fluid source enters the loop segment at the downstream loop point, and the secondary fluid flowing to the secondary fluid source exits the loop segment at the upstream loop point.

In some embodiments, the present invention provides a heat pump system operable with a refrigerant, a secondary fluid, a cooling load, and a heating load. The heat pump system comprises a chiller-A that includes a condenser-A and an evaporator-A. The heat pump system further comprises a chiller-B that includes a condenser-B and an evaporator-B. The heat pump system further comprises a secondary fluid source, a plurality of valves, and a fluid circulation loop conveying the secondary fluid and interconnecting the first chiller, the second chiller, the secondary fluid source and the plurality of valves. The fluid circulation loop is connectable to the cooling load and the heating load. The plurality of valves are selectively configurable to place the heat pump system in the following modes: an A/cooling mode to connect the evaporator-A in heat transfer relationship with the cooling load, a B/cooling mode to connect the evaporator-B in heat transfer relationship with the cooling load, an AB/cooling mode to connect the evaporator-A and evaporator-B in heat transfer relationship with the cooling load, an A/heating mode to connect the condenser-A in heat transfer relationship with the heating load, a B/heating mode to connect the condenser-B in heat transfer relationship with the heating load, and an AB/heating mode to connect the condenser-A and the condenser-B in heat transfer relationship with the heating load.

DESCRIPTION OF THE PREFERRED EMBODIMENT

Figure 1:
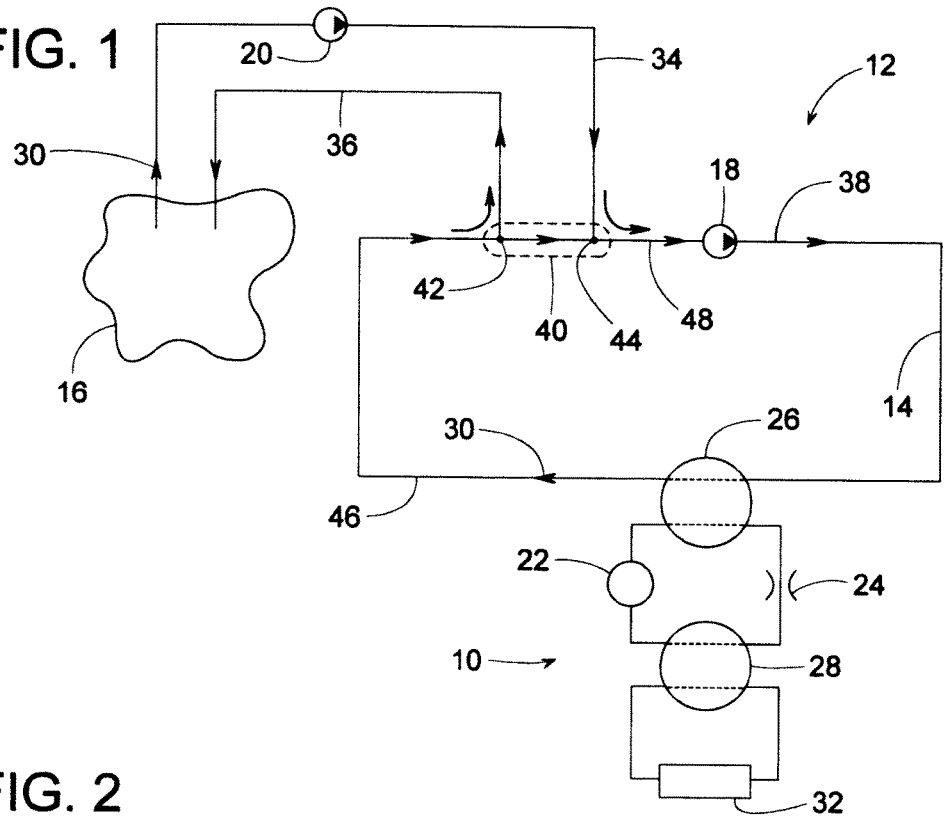
FIG. 1 is a schematic diagram of a heat pump system according to one example of the present invention.

FIG. 1 schematically illustrates a heat pump system 12 comprising a chiller 10, a fluid circulation loop 14, a secondary fluid source 16, a fluid circulation pump 18, and a secondary fluid pump 20. The term, "chiller" refers to any refrigerant circuit comprising a refrigerant compressor (e.g., centrifugal compressor, screw compressor, reciprocating compressor, scroll compressor, etc.), two heat exchangers (a condenser and an evaporator) and a flow restriction (e.g., expansion valve, orifice, capillary, etc.). Chiller 10, for example, includes a compressor 22, a flow restriction 24, and heat exchangers 26 and 28, wherein one heat exchanger functions as an evaporator and the other as a condenser.

With the refrigerant in heat exchanger 26 being in heat transfer relationship with a secondary fluid 30 (e.g., water, glycol, air, and combinations thereof) in loop 14, chiller 10 serves to effectively "pump" heat between fluid source 16 and some desired heating or cooling load 32 via heat exchanger 28. Examples of such a heating or cooling load include, but are not limited to, a current of air for conditioning a comfort zone (e.g., Variable Air Volume system), a current of water and/or glycol in a hydronic system, industrial process, etc. In some examples of the invention, refrigerant in heat exchanger 28 exchanges heat directly with a current of air.

Secondary fluid source 16 is schematically illustrated to represent any body of fluid or system from which heat can be exchanged and, in some examples, stored for later use. Fluid source 16 can be open or closed loop, it can be geothermal or some other type of heat storage system. Geothermal examples of secondary fluid source 16 include, but are not limited to, a groundwater well, a closed-loop buried pipe conveying fluid 30 in heat exchange relationship with the surrounding ground (i.e., a borefield), a lake, a river, etc. A conventional evaporative cooling tower is another example of secondary fluid source 16.

To exchange fluid (and its sensible heat energy) with source 16, loop 14 includes a loop segment 40 coupled to a supply line 34 and a return line 36 of source 16. Loop segment 40 includes an upstream loop point 42 and a downstream loop point 44, wherein the terms, "upstream" and "downstream" are in reference to fluid 30 flowing through segment 40. Secondary fluid pump 20 draws fluid 30 from source 16 and injects the fluid into loop 14 at downstream point 44. Concurrently, return line 36 withdraws a substantially equal amount of fluid from upstream point 42. Fluid injection at downstream point 44 and fluid withdrawal at upstream point 42 minimizes unnecessary mixing of the fluid exchanged between source 16 and loop 14. Segment 40 can be of any reasonable length and can be straight or have a plurality of turns; however, segment 40 preferably has no significant obstruction to minimize any adverse pressure differential between points 42 and 44.

Heat energy of the fluid exchanged at segment 40 is transferred to chiller 10 by way of fluid circulation pump 18 forcing fluid 30 to circulate through loop 14 and heat exchanger 26. In this example, fluid discharged from pump 18 flows sequentially through a discharge line 38, heat exchanger 26, a return line 46, loop segment 40, and a suction line 48 before returning to the inlet of pump 18. In some embodiments, the speed of pump 20 is varied depending on various temperature conditions (e.g., the temperature of source 16 relative to the temperature of loop 14) and/or to meet the temperature conditioning demand placed on system 12. The varying flow rate through pump 20 can be less than or equal to the fixed or variable flow through the main fluid circulation loop 14.

As fluid transfers between source 16 and loop 14, the sensible heat energy of the exchanged fluid transfers as well. The positive or negative fluid temperature differential between lines 34 and 36 determines whether that energy goes to loop 14 or to source 16. Either case can be desirable depending on whether chiller 10 is being used for heating and/or cooling or whether there is a need for storing energy in source 16. This will be explained in more detail with reference to FIGS. 5-16.

Figure 2:
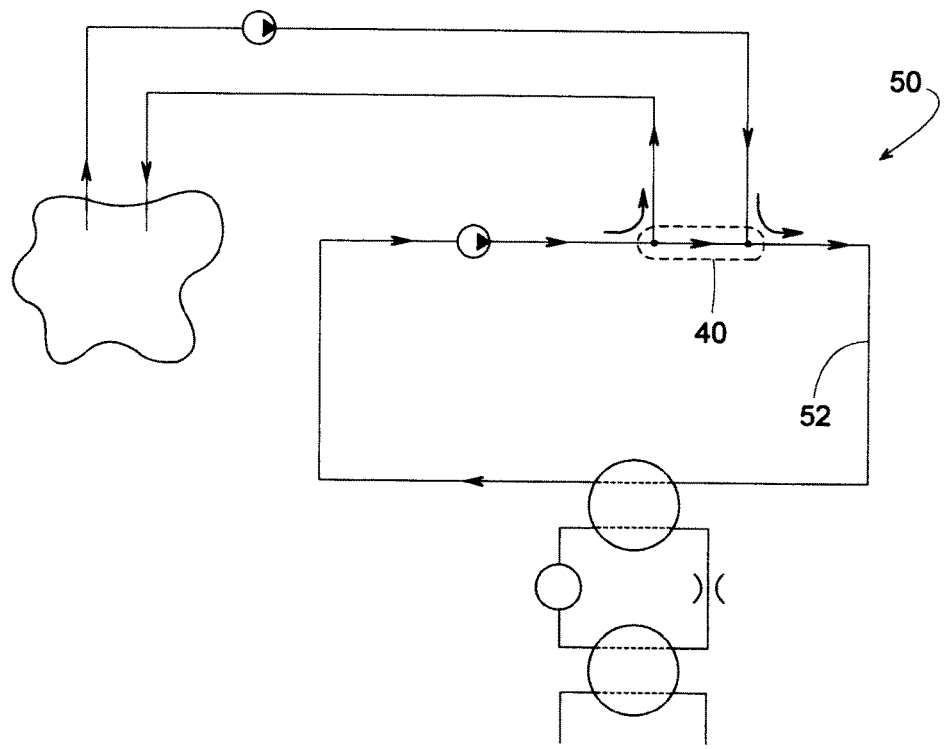
FIG. 2 is a schematic diagram of a heat pump system according to another example of the present invention.

FIG. 2 shows a heat pump system 50 similar to system 12 of FIG. 1; however, system 50 includes a fluid circulation loop 52 with loop segment 40 installed at an alternate location.

Figure 3:
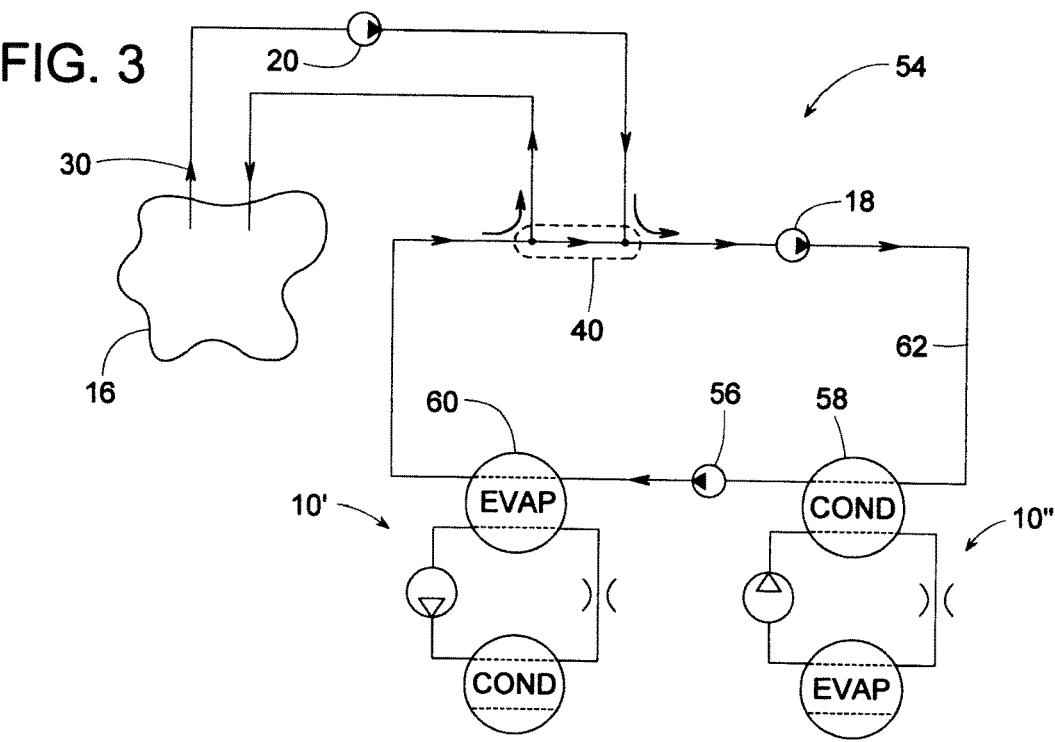
FIG. 3 is a schematic diagram of a heat pump system according to another example of the present invention.

FIG. 3 shows another heat pump system 54 similar to systems 12 and 50; however, heat pump system 54 includes two chillers 10' and 10" and an additional fluid circulation pump 56. Fluid 30 discharged from pump 18 flows sequentially through a condenser 58 of chiller 10", pump 56, an evaporator 60 of chiller 10', loop segment 40, and back to the inlet of pump 18.

In this example, pump 18 overcomes the fluid pressure drop across condenser 58, and pump 56 overcomes the fluid pressure drop across evaporator 60. Pump 20 overcomes the fluid pressure drop through source 16 (e.g., a geothermal closed-loop buried pipe). To transfer fluid and its thermal energy between source 16 and a loop 62, pump 20 and loop segment 40 operate in a manner similar to that of FIG. 1. It can be seen in FIG. 3 that the discharge from pump 20 leads to the inlet of pump 18, and the discharge from pump 18 leads to the inlet of pump 56. Such an arrangement in combination with each pump being designated to overcome the pressure drop across a particular section of the system lends itself well to the balanced control of more complicated systems, as illustrated in FIGS. 5-16.

Figure 4:
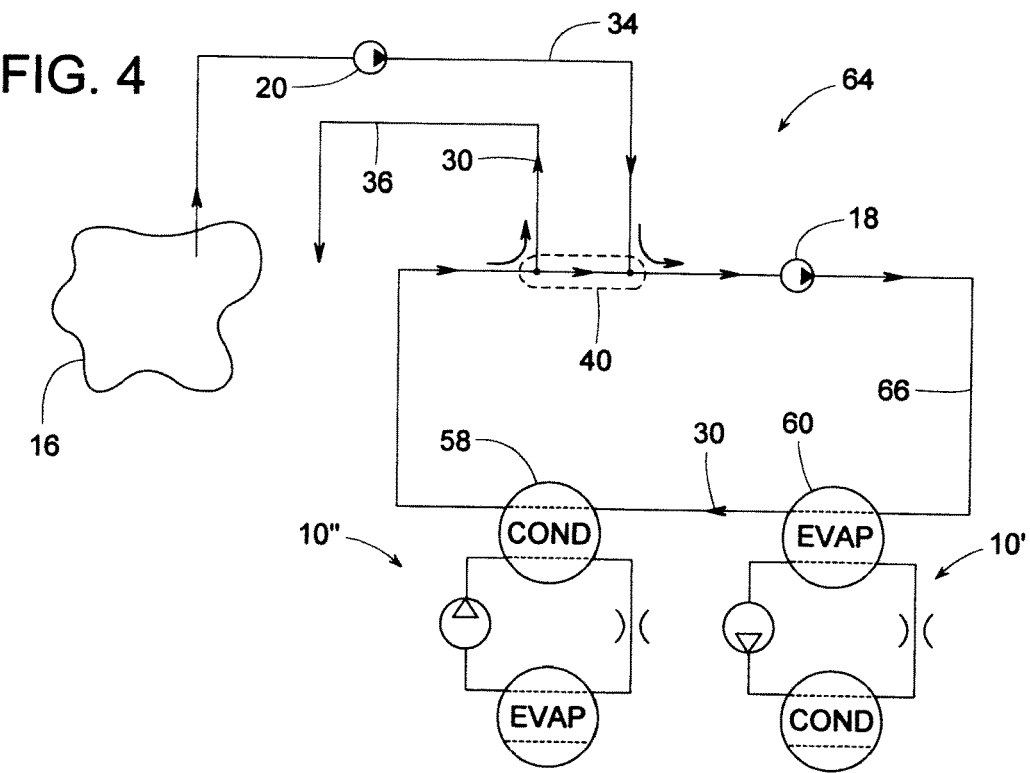
FIG. 4 is a schematic diagram of a heat pump system according to yet another example of the present invention.

FIG. 4 shows a heat pump system 64 similar to the one of FIG. 3. In this example, however, fluid 30 in a loop 66 flows first through evaporator 60 and then through condenser 58, and pump 56 is eliminated. Also, fluid source 16 is an open loop system. Pump 20 and supply line 34 deliver fluid 30 from source 16 to loop 66; however, fluid exiting loop 66 via return line 36 is discharged to a location other than directly back to source 16. Source 16, for example, can be a water well connected to supply line 34, and return line 36 can discharge fluid to a storm sewer drain.

FIGS. 5-16 show a heat pump system 70 selectively configurable to provide a plurality of modes, wherein each of the drawing figures illustrates a different mode. The various configurations are set up by selectively actuating a plurality of valves such as, for example, a dual-position 3-way directional valve 72 and several open/close valves 74, 76, 78, 80, 82 and 84.

Heat pump system 70 comprises a refrigerant system 86, a secondary fluid source 88 (e.g., source 16), and a fluid circulation loop 90. Loop 90 couples refrigerant system 86 to fluid source 88 and, depending on the need, selectively connects a heating load 92 and/or a cooling load 94 in heat transfer relationship with condensers and/or evaporators of refrigerant system 86.

In the example of heat pump system 70, refrigerant system 86 includes two chillers, a chiller 10a (also referred to as chiller-A or a first chiller) and a chiller 10b (also referred to as chiller-B or a second chiller). A closed-loop refrigerant circuit 11a of chiller 10a interconnects a compressor 22a, a condenser 26a, a flow restriction 24a and an evaporator 28a, wherein the refrigerant flows in that order through those components. Similarly, a closed-loop refrigerant circuit 11b of chiller 10b interconnects a compressor 22b, a condenser 26b, a flow restriction 24b and an evaporator 28b. Refrigerant circuits 11a and 11b are unidirectional in that the refrigerant flows through the same sequence of chiller components, regardless of the operating mode. Thus, if a chiller's heat exchanger functions as an evaporator, it will do so regardless of whether the chiller is primarily used for heating or cooling. In the illustrated example, condensers 26a and 26b and evaporators 28a and 28b are dedicated condensers and evaporators respectively, which means the function of each of these heat exchangers does not switch between condensing and evaporating, regardless of the heat pump's operating mode.

To circulate secondary fluid 30 through loop 90 and to exchange fluid 30 between source 88 and loop 90, heat pump system 70 includes pumps 100, 102, 104, 106 and 108. Pump 100 is a secondary fluid pump driven at variable speed to overcome the fluidic pressure drop through source 88 and to exchange a desired amount of secondary fluid 30 between source 88 and loop 90. When various temperature sensors call for the operation of pump 100, the speed of pump 100 is controlled in response to a feedback signal 96 from temperature sensor 110 or a feedback signal 98 from a temperature sensor 112, depending on the chosen operating mode. The speed of pump 100 is controlled to exchange only the needed amount of fluid between source 88 and loop 90, while one or more of the other pumps convey the desired flow through loop 90 and chillers 10a and 10b. The flow rate through loop 90 is generally greater than or equal to the flow through source 88.

When an operating mode calls for the operation of pump 102, the speed of pump 102 is controlled in response to a feedback signal 114 from a pressure differential sensor 116 to maintain a desired mass flow rate through condenser 26a and/or 26b. When an operating mode calls for the operation of pump 104, the speed of pump 104 is controlled in response to a feedback signal 118 from a pressure differential sensor 120 to maintain a desired mass flow rate through evaporator 28a and/or 28b.

When an operating mode calls for the operation of pump 106, the speed of pump 106 is controlled in response to a feedback signal 122 from a pressure differential sensor 124 to maintain a desired mass flow rate through heating load 92. When an operating mode calls for the operation of pump 108, the speed of pump 108 is controlled in response to a feedback signal 126 from a pressure differential sensor 128 to maintain a desired mass flow rate through cooling load 94.

It should be appreciated that the feedback signals from the various sensors are first inputted to and processed by an appropriate system controller (e.g., a computer, PLC, etc.) to create corresponding controller output signals suitable for controlling a valve's actuator or a pump motor's variable speed drive unit.

Figure 5:
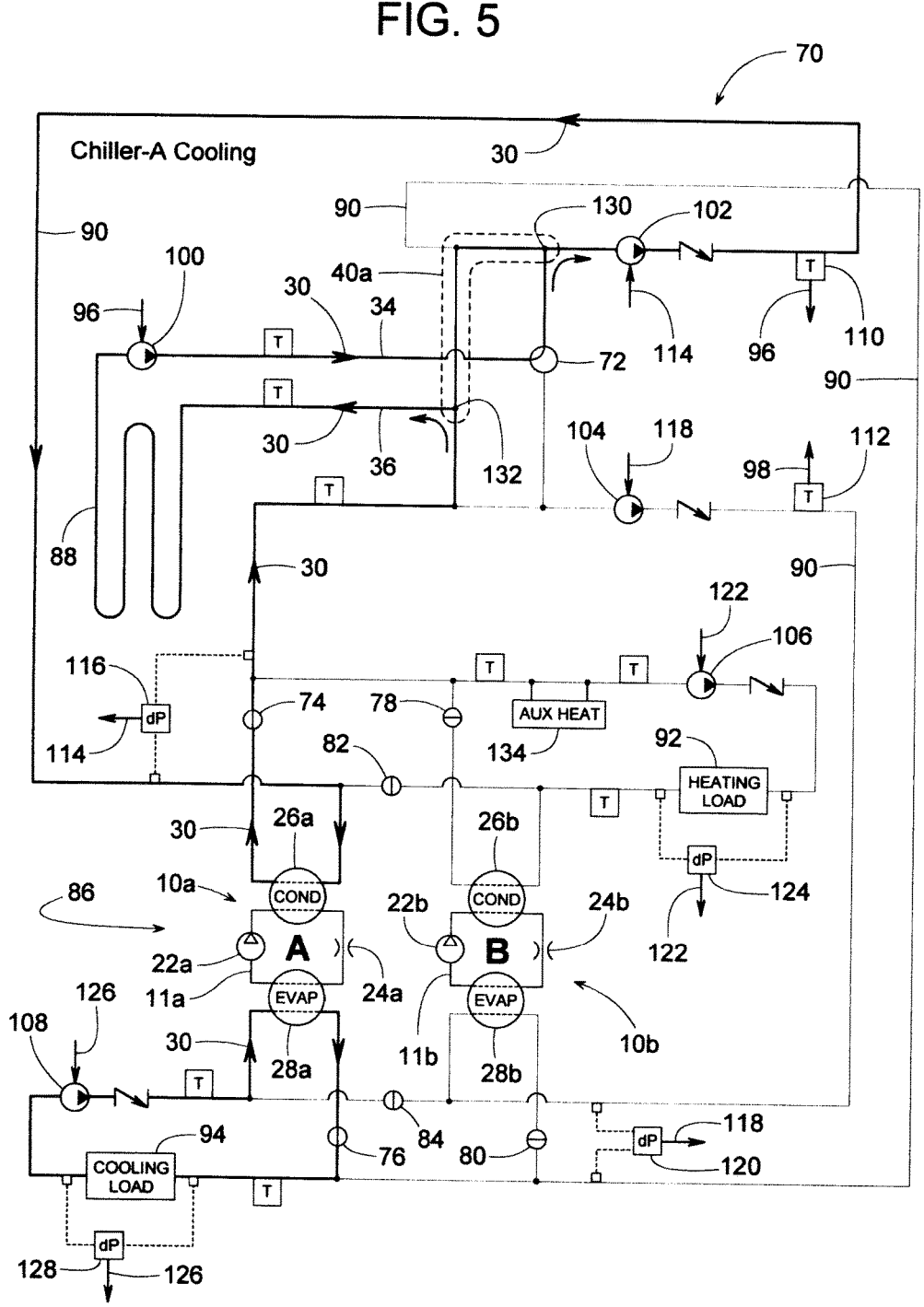
FIG. 5 is a schematic diagram of a heat pump system according to another example of the present invention with the system is configured to operate in an "A/cooling mode."

FIG. 5 shows heat pump system 70 configured in an A/cooling mode, wherein chiller 10a cools load 94 while chiller 10b is inactive, and basically no heat is delivered to heating load 92. To operate in this mode, valve 72 is actuated to direct secondary fluid 30 from source 88 to pump 102. The speed of pump 102 is controlled in response to signal 114 from pressure differential sensor 116 to maintain a desired mass flow rate through condenser 26a. Valves 74 and 76 are open; valves 78, 80, 82 and 84 are closed; and pumps 104 and 106 are inactive. This allows evaporator 28a to cool load 94 as pump 108 circulates fluid 30 between evaporator 28a and cooling load 94. The speed of pump 108 is controlled in response to signal 126 from pressure differential sensor 128 to maintain a desired mass flow rate through cooling load 94.

To exchange fluid and its sensible heat energy between source 88 and loop 90, pump 100 forces fluid 30 from source 88, through supply line 34, and through directional valve 72 to enter a loop segment 40a at a point 130. Consequently, a substantially equal amount of fluid, albeit at a higher temperature, exits loop segment 40a at a point 132 and returns to source 88 via return line 36. To drive the exchange of fluid between source 88 and loop 90, the speed of pump 100 is controlled in response to signal 96 from temperature sensor 110 to maintain the fluid flowing to condenser 26a at a predetermined target temperature.

In the example illustrated by FIGS. 5-16, loop 90 encompasses all the lines conveying secondary fluid 30, with the exception of supply line 34, return line 36, and secondary fluid source 88. It should also be noted that the temperature of source 88 may vary seasonally or change or drift for other reasons, so the temperature of the fluid drawn from source 88 may at times be inadequate for one or more of the operating modes illustrated in FIG. 5-16. In some cases, however, the operation of heat pump system 70 may continue without the benefit of transferring fluid with source 88. Some examples of heat pump system 70 include an auxiliary heater 134 and/or an auxiliary cooling tower to augment the transfer of heat to or from loop 90.

Figure 6:
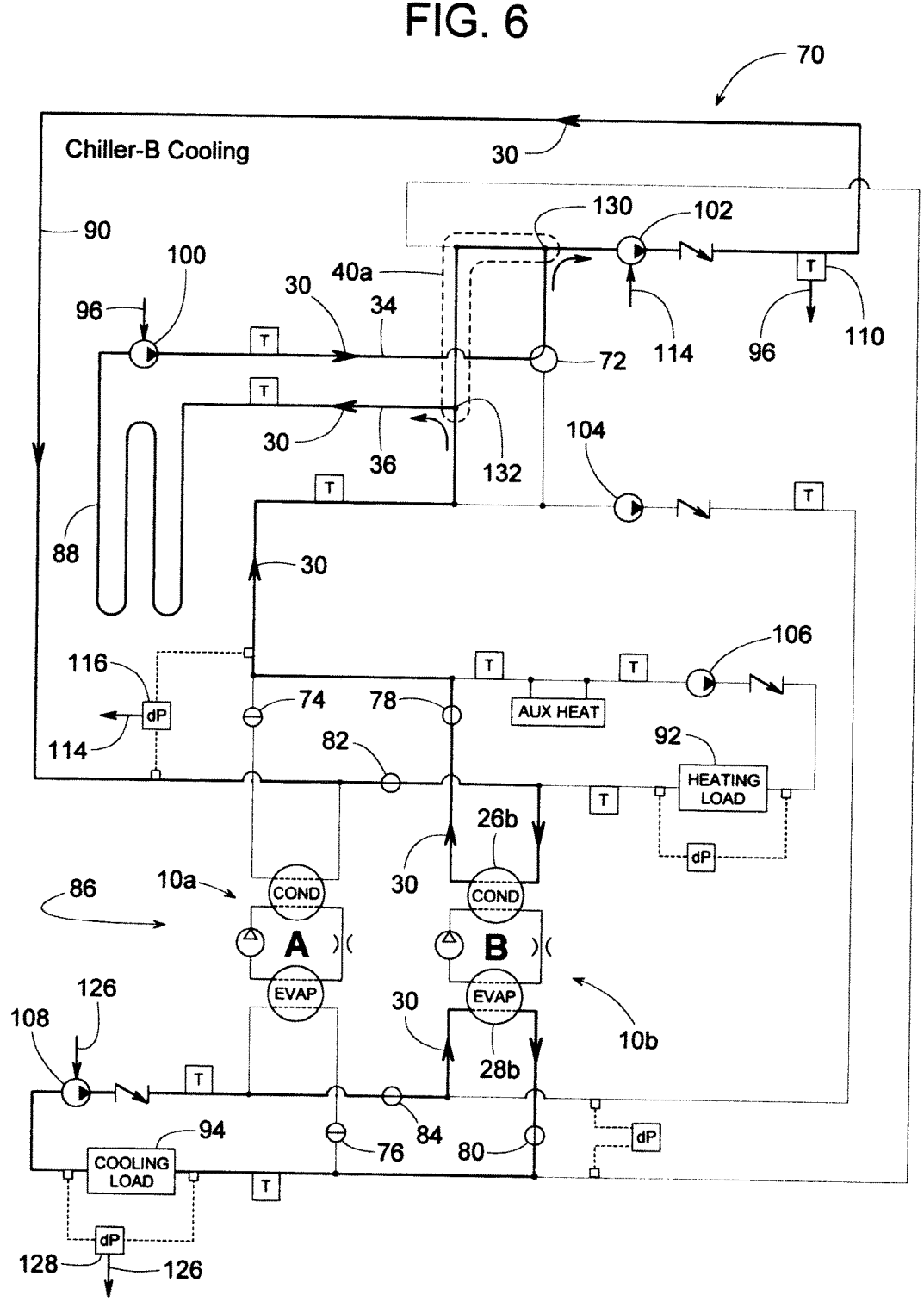
FIG. 6 is a schematic diagram of the heat pump system FIG. 5 but showing the system configured to operate in a "B/cooling mode."

FIG. 6 shows heat pump system 70 configured in B/cooling mode, wherein chiller 10b cools load 94 while chiller 10a is inactive, and basically no heat is delivered to heating load 92. To operate in this mode, valve 72 is actuated to direct secondary fluid 30 from source 88 to pump 102. The speed of pump 102 is controlled in response to signal 114 from pressure differential sensor 116 to maintain a desired mass flow rate through condenser 28b. Valves 78, 80, 82 and 84 are opened; valves 74 and 76 are closed; and pumps 104 and 106 are inactive. This allows evaporator 28b to cool load 94 as pump 108 circulates fluid 30 between evaporator 28b and cooling load 94. The speed of pump 108 is controlled in response to signal 126 from pressure differential sensor 128 to maintain a desired mass flow rate through cooling load 94.

To exchange fluid and its sensible heat energy between source 88 and loop 90, pump 100 forces fluid from source 88, through supply line 34, and through directional valve 72 to enter loop segment 40a at point 130. Consequently, a substantially equal amount of fluid, albeit at a higher temperature, exits loop segment 40a at a point 132 and returns to source 88 via return line 36. To drive the exchange of fluid between source 88 and loop 90, the speed of pump 100 is controlled in response to signal 96 from temperature sensor 110 to maintain the fluid flowing to condenser 26b at a predetermined target temperature.

Figure 7:
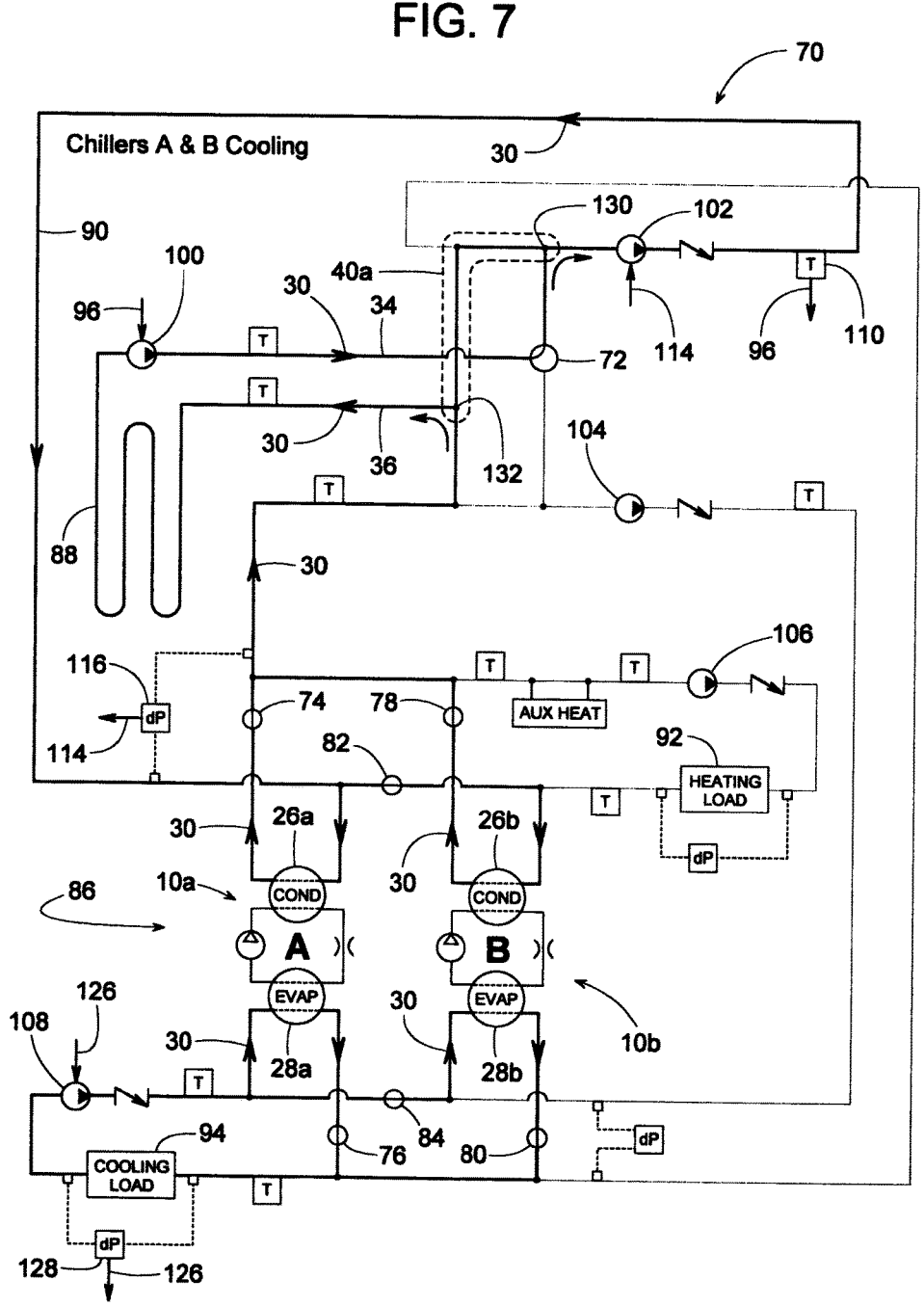
FIG. 7 is a schematic diagram of the heat pump system FIG. 5 but showing the system configured to operate in an "AB/cooling mode."

FIG. 7 shows heat pump system 70 configured in an AB/cooling mode, wherein evaporator 28a of chiller 10a and evaporator 28b of chiller 10b both cool load 94 while basically no heat is delivered to heating load 92. To operate in this mode, valve 72 is actuated to direct secondary fluid 30 from source 88 to pump 102. The speed of pump 102 is controlled in response to signal 114 from pressure differential sensor 116 to maintain a desired mass flow rate through condensers 26a and 26b. Valves 74, 76, 78, 80, 82 and 84 are open, and pumps 104 and 106 are inactive. This allows evaporators 28a and 28b to cool load 94 as pump 108 circulates fluid 30 between cooling load 94 and the two evaporators. The speed of pump 108 is controlled in response to signal 126 from pressure differential sensor 128 to maintain a desired mass flow rate through cooling load 94.

To exchange fluid and its sensible heat energy between source 88 and loop 90, pump 100 forces fluid from source 88, through supply line 34, and through directional valve 72 to enter loop segment 40a at point 130. Consequently, a substantially equal amount of fluid, albeit at a higher temperature, exits loop segment 40a at point 132 and returns to source 88 via return line 36. To drive the exchange of fluid between source 88 and loop 90, the speed of pump 100 is controlled in response to signal 96 from temperature sensor 110 to maintain the fluid flowing to condensers 26a and 26b at a predetermined target temperature.

Figure 8:
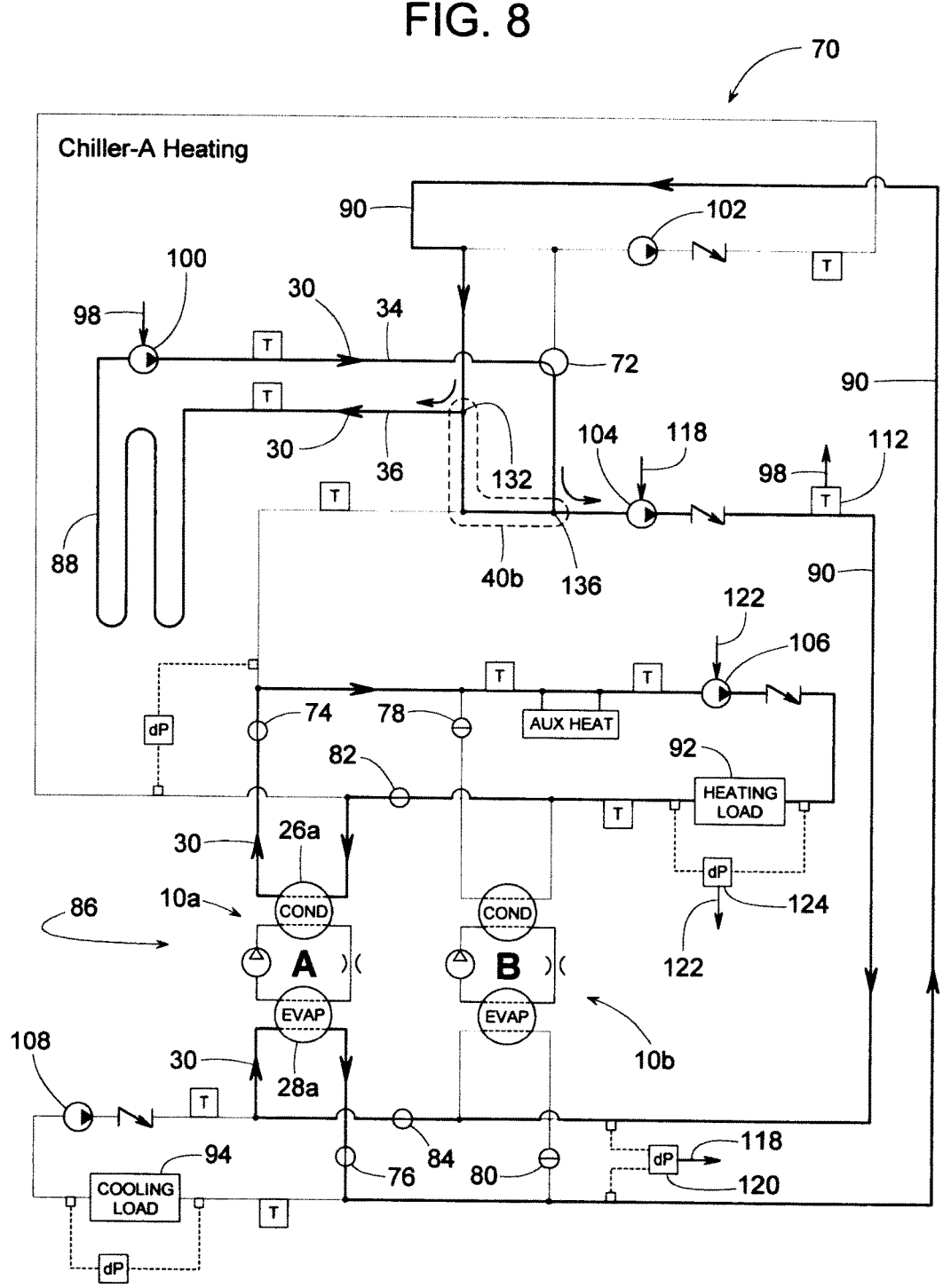
FIG. 8 is a schematic diagram of the heat pump system FIG. 5 but showing the system configured to operate in an "A/heating mode."

FIG. 8 shows heat pump system 70 configured in an A/heating mode, wherein chiller 10a heats load 92 while chiller 10b is inactive, and basically no chilled fluid is delivered to cooling load 94. To operate in this mode, valve 72 is actuated to direct secondary fluid 30 from source 88 to pump 104. The speed of pump 104 is controlled in response to signal 118 from pressure differential sensor 120 to maintain a desired mass flow rate through evaporator 28a. Valves 74, 76, 82 and 84 are open; valves 78 and 80 are closed; and pumps 102 and 108 are inactive. This allows condenser 26a to heat load 92 as pump 106 circulates fluid 30 between condenser 26a and heating load 92. The speed of pump 106 is controlled in response to signal 122 from pressure differential sensor 124 to maintain a desired mass flow rate through heating load 92.

To exchange fluid and its sensible heat energy between source 88 and loop 90, pump 100 forces fluid from source 88, through supply line 34, and through directional valve 72 to enter a loop segment 40b at a point 136. Consequently, a substantially equal amount of fluid, albeit at a lower temperature, exits loop segment 40b at point 132 and returns to source 88 via return line 36. To drive the exchange of fluid between source 88 and loop 90, the speed of pump 100 is controlled in response to signal 98 from temperature sensor 112 to maintain the fluid flowing to evaporator 28a at a predetermined target temperature.

Figure 9:
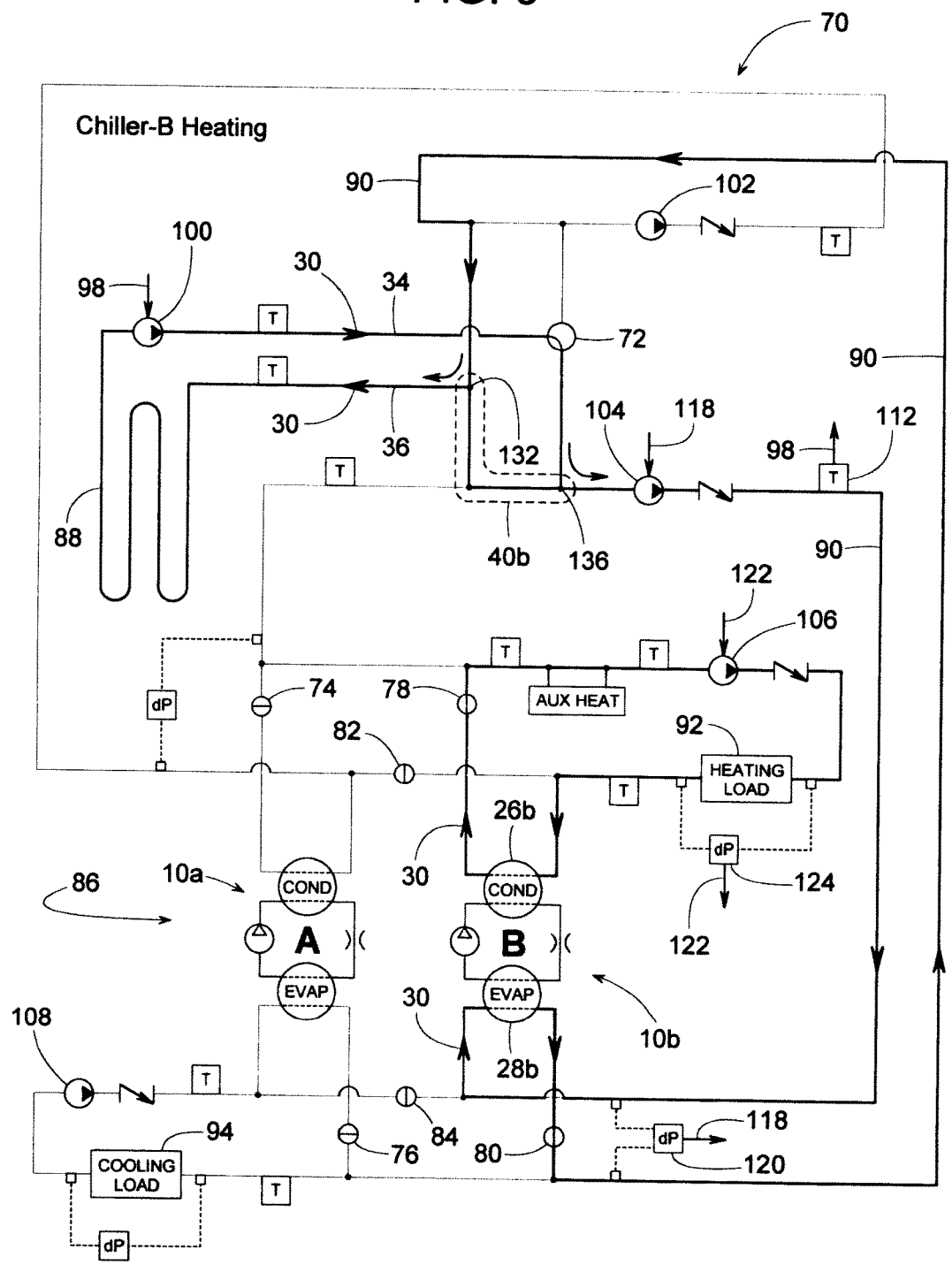
FIG. 9 is a schematic diagram of the heat pump system FIG. 5 but showing the system configured to operate in a "B/heating mode."

FIG. 9 shows heat pump system 70 configured in a B/heating mode, wherein chiller 10b heats load 92 while chiller 10a is inactive, and basically no chilled fluid is delivered to cooling load 94. To operate in this mode, valve 72 is actuated to direct secondary fluid 30 from source 88 to pump 104. The speed of pump 104 is controlled in response to signal 118 from pressure differential sensor 120 to maintain a desired mass flow rate through evaporator 28b. Valves 78 and 80 are open; valves 74, 76, 82 and 84 are closed; and pumps 102 and 108 are inactive. This allows condenser 26b to heat load 92 as pump 106 circulates fluid 30 between condenser 26b and heating load 92. The speed of pump 106 is controlled in response to signal 122 from pressure differential sensor 124 to maintain a desired mass flow rate through heating load 92.

To exchange fluid and its sensible heat energy between source 88 and loop 90, pump 100 forces fluid 30 from source 88, through supply line 34, and through directional valve 72 to enter loop segment 40b at point 136. Consequently, a substantially equal amount of fluid, albeit at a lower temperature, exits loop segment 40b at a point 132 and returns to source 88 via return line 36. To drive the exchange of fluid between source 88 and loop 90, the speed of pump 100 is controlled in response to signal 98 from temperature sensor 112 to maintain the fluid flowing to evaporator 28b at a predetermined target temperature.

Figure 10:
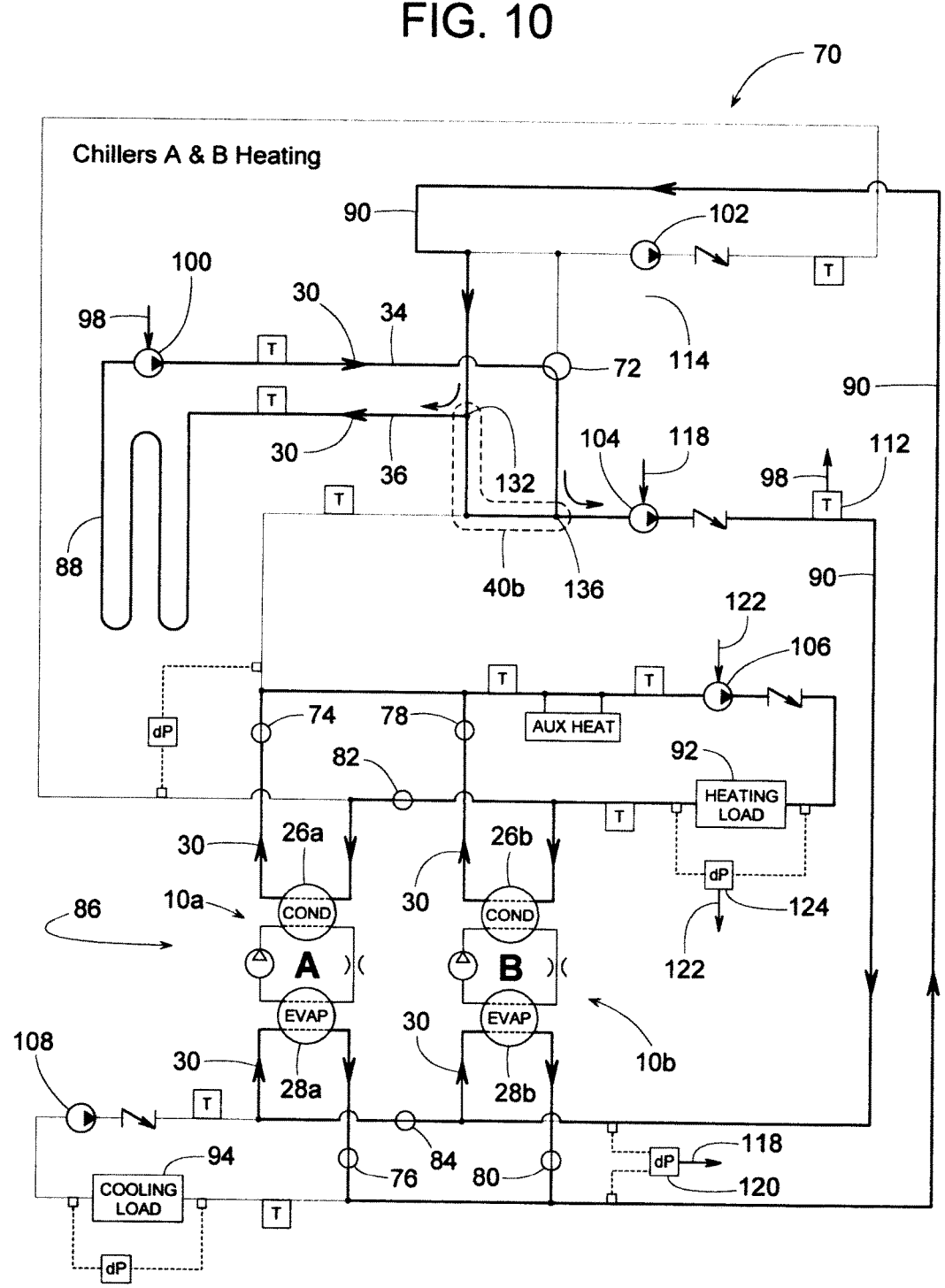
FIG. 10 is a schematic diagram of the heat pump system FIG. 5 but showing the system configured to operate in an "AB/cooling mode."

FIG. 10 shows heat pump system 70 configured in an AB/heating mode, wherein the condensers of chillers 10a and 10b heat load 92 and basically no chilled fluid is delivered to cooling load 94. To operate in this mode, valve 72 is actuated to direct secondary fluid 30 from source 88 to pump 104. The speed of pump 104 is controlled in response to signal 118 from pressure differential sensor 120 to maintain a desired mass flow rate through evaporators 28a and 28b. Valves 74, 76, 78, 80, 82 and 84 are open, and pumps 102 and 108 are inactive. This allows condensers 26a and 26b to heat load 92 as pump 122 circulates fluid 30 between heating load 92 and the two condensers 26a and 26b. The speed of pump 106 is controlled in response to signal 122 from pressure differential sensor 124 to maintain a desired mass flow rate through heating load 92.

To exchange fluid and its sensible heat energy between source 88 and loop 90, pump 100 forces fluid from source 88, through supply line 34, and through directional valve 72 to enter loop segment 40b at point 132. Consequently, a substantially equal amount of fluid, albeit at a lower temperature, exits loop segment 40b at point 136 and returns to source 88 via return line 36. To drive the exchange of fluid between source 88 and loop 90, the speed of pump 100 is controlled in response to signal 98 from temperature sensor 112 to maintain the fluid flowing to evaporators 28a and 28b at a predetermined target temperature.

Figure 11:
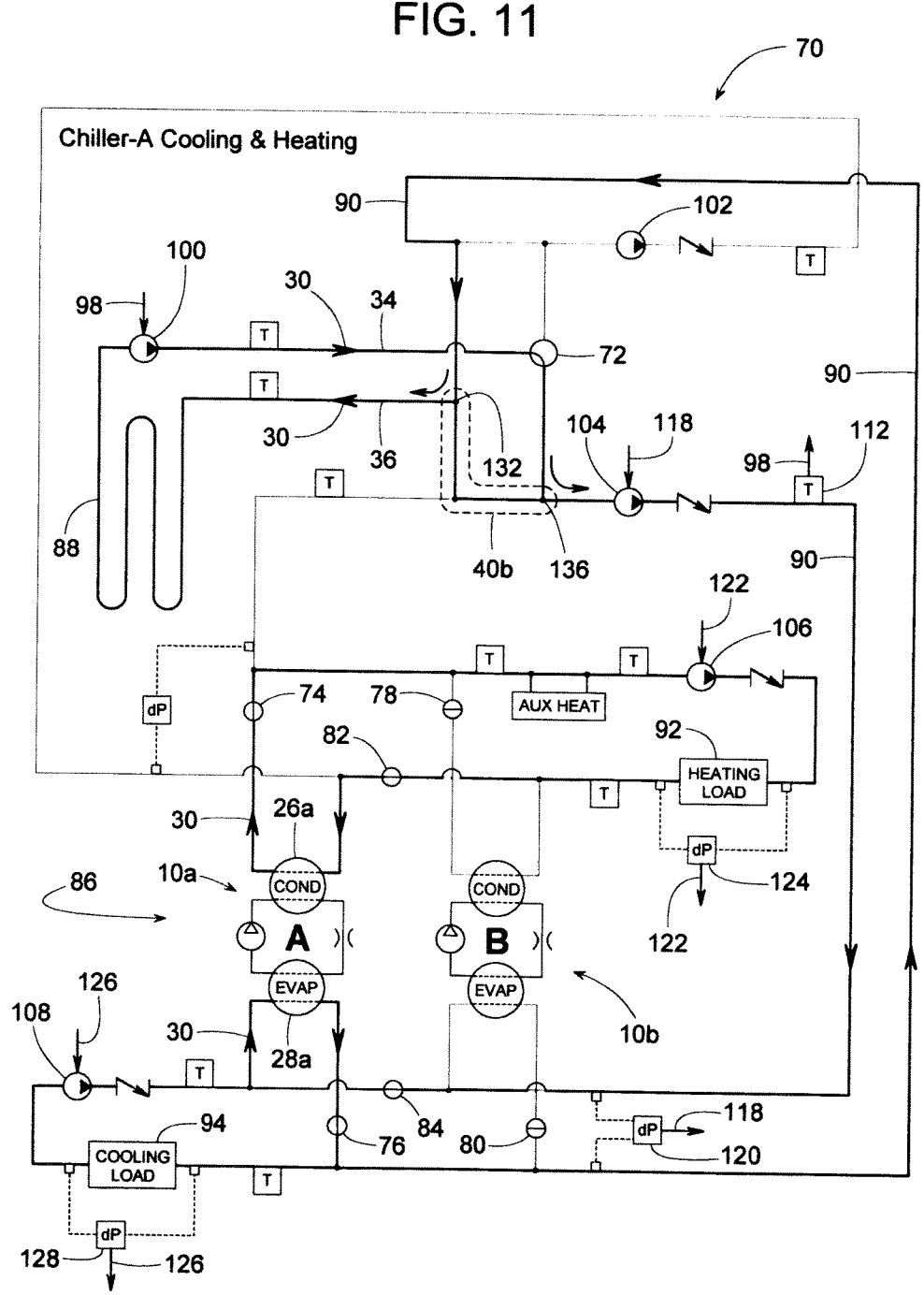
FIG. 11 is a schematic diagram of the heat pump system FIG. 5 but showing the system configured to operate in an "A/heating-cooling mode."

FIG. 11 shows heat pump system 70 configured in an A/heating-cooling mode, wherein chiller 10a simultaneously heats and cools loads 92 and 94 while chiller 10b is inactive. To operate in this mode, valve 72 is actuated to direct secondary fluid 30 from source 88 to pump 104. Valves 74, 76, 82 and 84 are open; valves 78 and 80 are closed; and pump 102 is inactive. The speed of pump 104 is controlled in response to signal 118 from pressure differential sensor 120 to maintain a desired mass flow rate through evaporator 28a. The speed of pump 108 is controlled in response to signal 126 from pressure differential sensor 128 to maintain a desired mass flow rate through cooling load 94. The speed of pump 106 is controlled in response to signal 122 from pressure differential sensor 124 to maintain a desired mass flow rate through heating load 92. This allows condenser 26a to heat load 92 as pump 106 circulates fluid 30 between heating load 92 and condenser 26a and allows evaporator 28a to cool load 94 as pump 108 circulates fluid between cooling load 94 and evaporator 28a.

To exchange fluid and its sensible heat energy between source 88 and loop 90, pump 100 forces fluid from source 88, through supply line 34, and through directional valve 72 to enter loop segment 40b at point 136. Consequently, a substantially equal amount of fluid, albeit at a different temperature, exits loop segment 40b at a point 132 and returns to source 88 via return line 36. To drive the exchange of fluid between source 88 and loop 90, the speed of pump 100 is controlled in response to signal 98 from temperature sensor 112 to maintain the fluid flowing to evaporator 28a at a predetermined target temperature.

Figure 12:
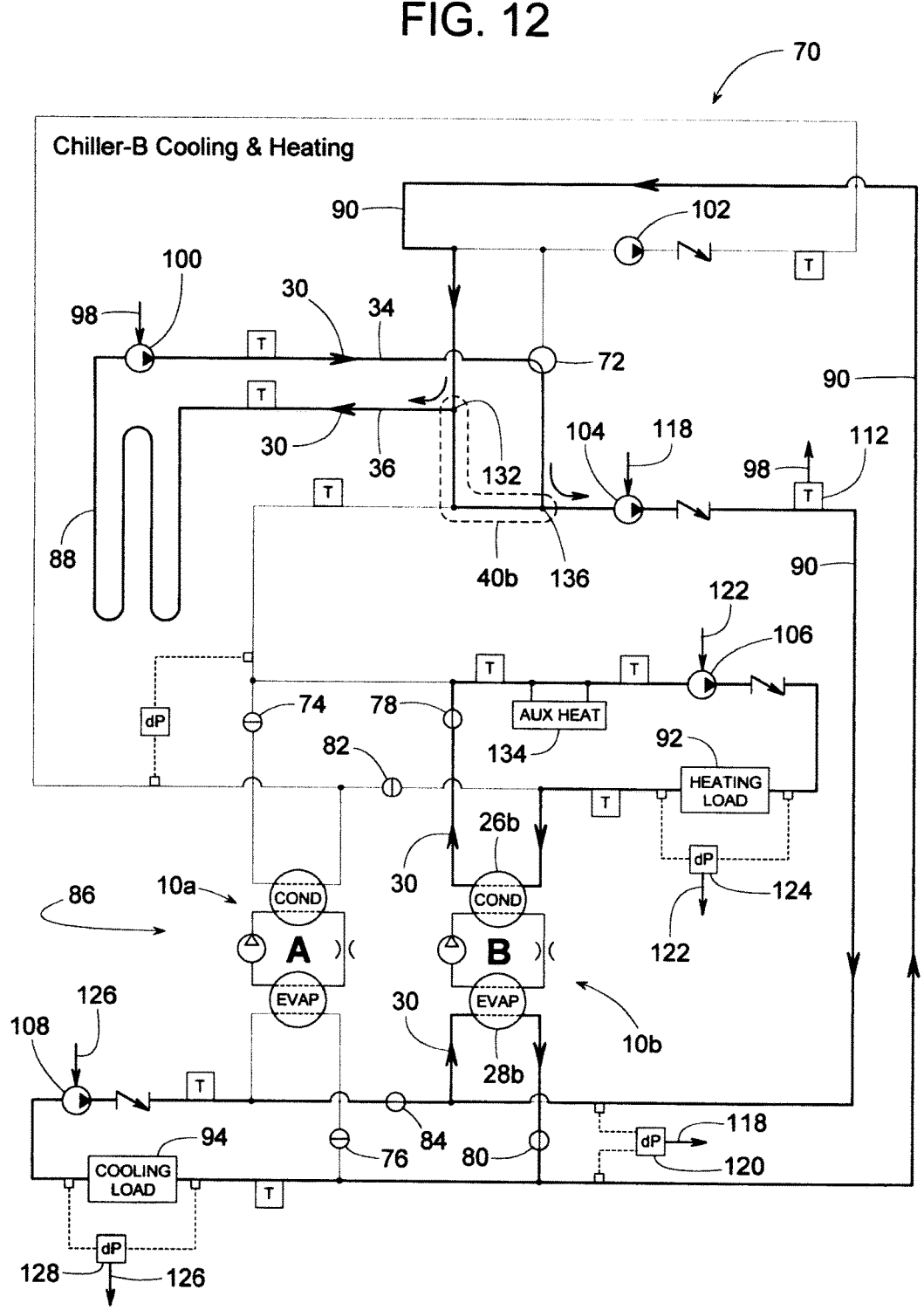
FIG. 12 is a schematic diagram of the heat pump system FIG. 5 but showing the system configured to operate in a "B/heating-cooling mode."

FIG. 12 shows heat pump system 70 configured in a B/heating-cooling mode, wherein chiller 10b simultaneously heats and cools loads 92 and 94, respectively, while chiller 10a is inactive. To operate in this mode, valve 72 is actuated to direct secondary fluid 30 from source 88 to pump 104. Valves 78, 80 and 84 are open; valves 72, 76 and 82 are closed; and pump 102 is inactive. The speed of pump 104 is controlled in response to signal 118 from pressure differential sensor 120 to maintain a desired mass flow rate through evaporator 28b. The speed of pump 108 is controlled in response to signal 126 from pressure differential sensor 128 to maintain a desired mass flow rate through cooling load 94. The speed of pump 106 is controlled in response to signal 122 from pressure differential sensor 124 to maintain a desired mass flow rate through heating load 92. This allows condenser 28b to heat load 92 as pump 106 circulates fluid 30 between heating load 92 and condenser 26b and allows evaporator 28b to cool load 94 as pump 108 circulates fluid between cooling load 94 and evaporator 28b.

To exchange fluid and its sensible heat energy between source 88 and loop 90, pump 100 forces fluid from source 88, through supply line 34, and through directional valve 72 to enter loop segment 40b at point 136. Consequently, a substantially equal amount of fluid, albeit at a different temperature, exits loop segment 40b at a point 132 and returns to source 88 via return line 36. To drive the exchange of fluid between source 88 and loop 90, the speed of pump 100 is controlled in response to signal 98 from temperature sensor 112 to maintain the fluid flowing to evaporator 28b at a predetermined target temperature.

Figure 13:
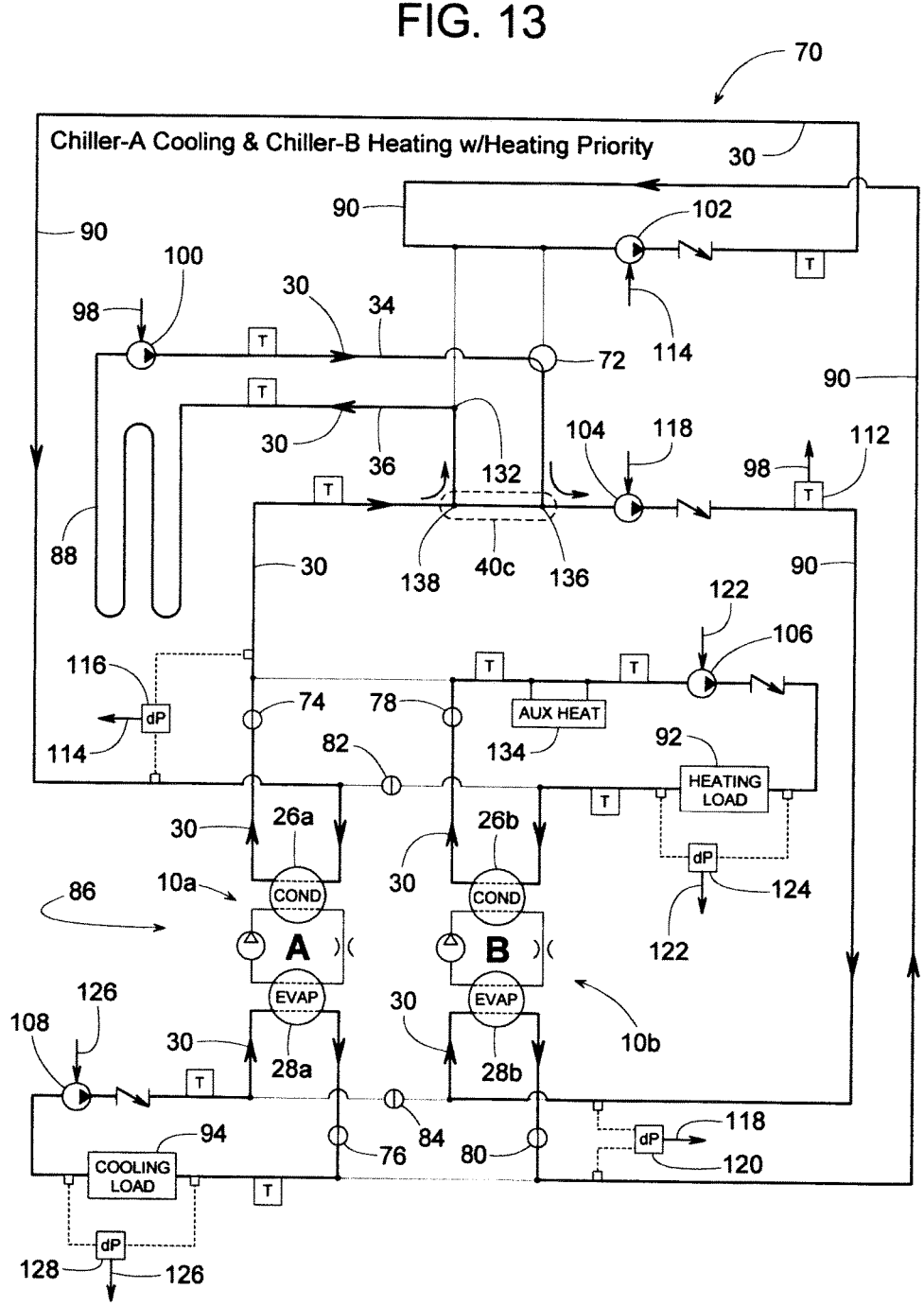
FIG. 13 is a schematic diagram of the heat pump system FIG. 5 but showing the system configured to operate in an "A/cooling-B/heating mode" with heating priority.

FIG. 13 shows heat pump system 70 configured in an A/cooling-B/heating mode, wherein evaporator 28a of chiller 10a cools load 94 while condenser 26b of chiller 10b heats load 92. To operate in this mode, with the heating of load 92 being a priority, valve 72 is actuated to direct secondary fluid 30 from source 88 to pump 104. Valves 74, 76, 78 and 80 are open and valves 82 and 84 are closed. The speed of pump 104 is controlled in response to signal 118 from pressure differential sensor 120 to maintain a desired mass flow rate through evaporator 28b. The speed of pump 108 is controlled in response to signal 126 from pressure differential sensor 128 to maintain a desired mass flow rate through cooling load 94. The speed of pump 106 is controlled in response to signal 122 from pressure differential sensor 124 to maintain a desired mass flow rate through heating load 92. And the speed of pump 102 is controlled in response to signal 114 from pressure differential sensor 116 to maintain a desired mass flow rate through condenser 26a. This allows condenser 26b to heat load 92 as pump 106 circulates fluid 30 between heating load 92 and condenser 26b and allows evaporator 28a to cool load 94 as pump 108 circulates fluid between cooling load 94 and evaporator 28a. This configuration also allows fluid leaving evaporator 28b to withdraw heat from condenser 26a prior to that fluid being returned to source 88 and/or returned to the inlet of pump 104.

To exchange fluid and its sensible heat energy between source 88 and loop 90, pump 100 forces fluid from source 88, through supply line 34, and through directional valve 72 to enter a loop segment 40c at point 136. Consequently, a substantially equal amount of fluid, albeit at a different temperature, exits loop segment 40c at a point 138 and returns to source 88 via return line 36. To drive the exchange of fluid between source 88 and loop 90, the speed of pump 100 is controlled in response to signal 98 from temperature sensor 112 to maintain the fluid flowing to evaporator 28b at a predetermined target temperature.

Figure 14:
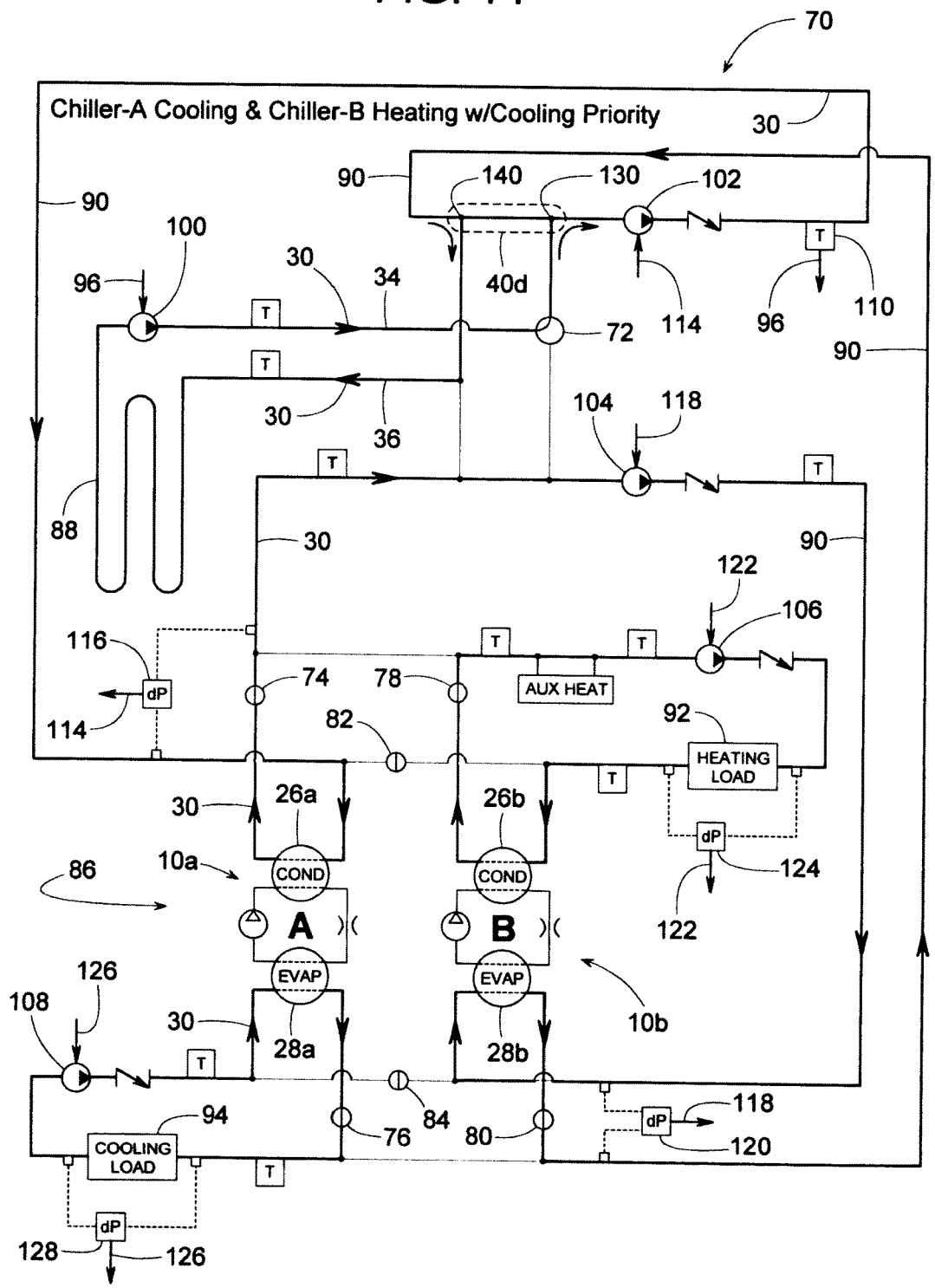
FIG. 14 is a schematic diagram of the heat pump system FIG. 5 but showing the system configured to operate in an "A/cooling-B/heating mode" with cooling priority.

FIG. 14 shows heat pump system 70 configured in another A/cooling-B/heating mode, wherein evaporator 28a of chiller 10a cools load 94 while condenser 26b of chiller 10b heat load 92. To operate in this mode, with the cooling of load 90 being a priority, valve 72 is actuated to direct secondary fluid 30 from source 88 to pump 102. Valves 74, 76, 78 and 80 are open and valves 82 and 84 are closed. The speed of pump 102 is controlled in response to signal 114 from pressure differential sensor 116 to maintain a desired mass flow rate through condenser 26a. The speed of pump 108 is controlled in response to signal 126 from pressure differential sensor 128 to maintain a desired mass flow rate through cooling load 94. The speed of pump 106 is controlled in response to signal 122 from pressure differential sensor 124 to maintain a desired mass flow rate through heating load 92. And the speed of pump 104 is controlled in response to signal 118 from pressure differential sensor 120 to maintain a desired mass flow rate through evaporator 28b. This allows condenser 26b to heat load 92 as pump 106 circulates fluid 30 between heating load 92 and condenser 26b and allows evaporator 28a to cool load 94 as pump 108 circulates fluid between cooling load 94 and evaporator 28a. This configuration also allows fluid leaving condenser 26a to reject heat to evaporator 28b prior to that fluid being returned to source 88 and/or returned to the inlet of pump 102.

To exchange fluid and its sensible heat energy between source 88 and loop 90, pump 100 forces fluid from source 88, through supply line 34, and through directional valve 72 to enter a loop segment 40d at point 130. Consequently, a substantially equal amount of fluid, albeit at a different temperature, exits loop segment 40d at a point 140 and returns to source 88 via return line 36. To drive the exchange of fluid between source 88 and loop 90, the speed of pump 100 is controlled in response to signal 96 from temperature sensor 110 to maintain the fluid flowing to condenser 26a at a predetermined target temperature.

Figure 15:
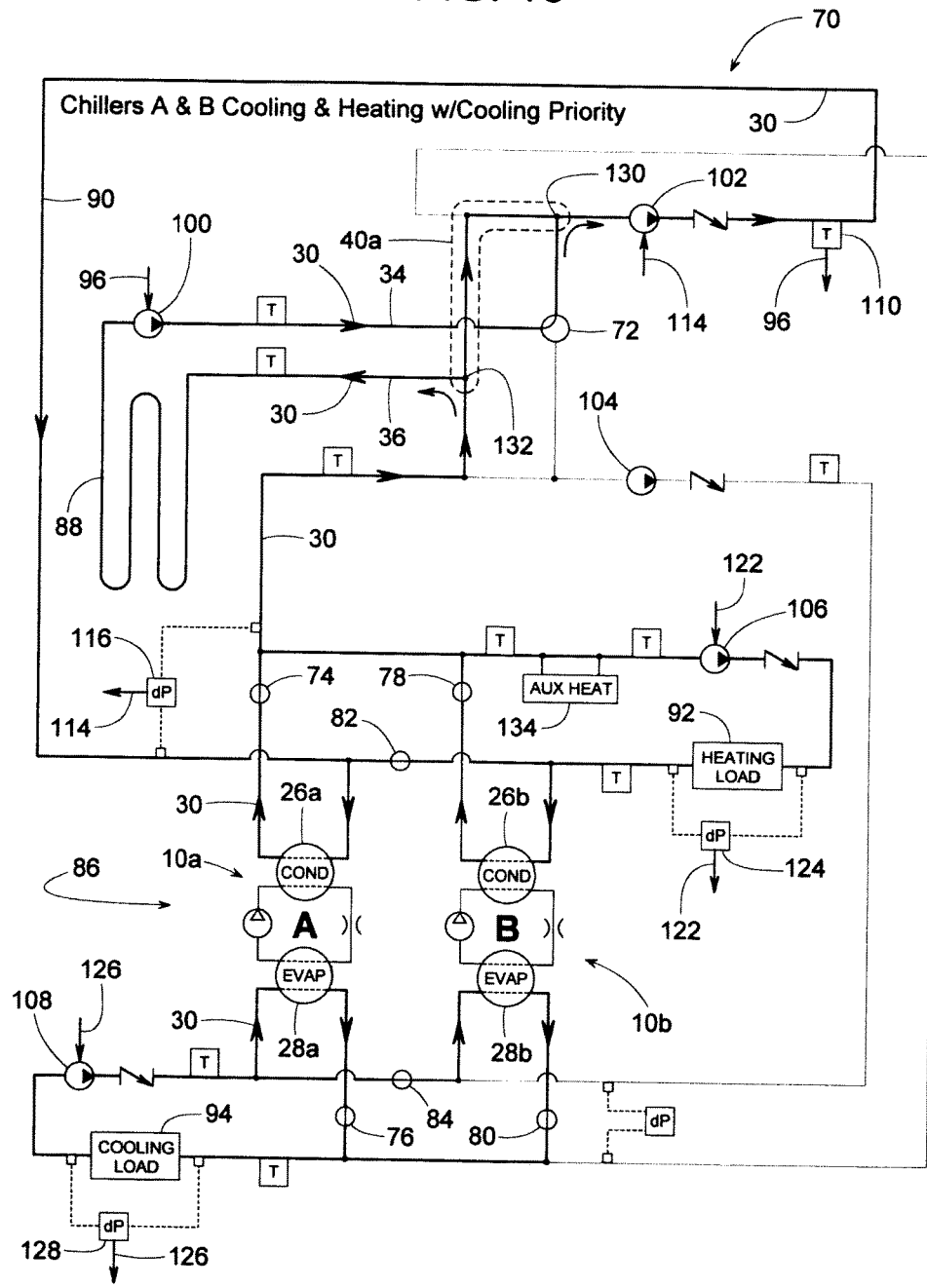
FIG. 15 is a schematic diagram of the heat pump system FIG. 5 but showing the system configured to operate in an "AB/heating-cooling mode" with cooling priority.

FIG. 15 shows heat pump system 70 configured in an AB/heating-cooling mode, wherein evaporators 28a and 28b of chillers 10a and 10b both cool load 94 while condensers 26a and 26b of chillers 10a and 10b both heat load 92. To operate in this mode, with the cooling of load 94 being a priority, valve 72 is actuated to direct secondary fluid 30 from source 88 to pump 102. Valves 74, 76, 78, 80, 82 and 84 are open, and pump 104 is inactive. The speed of pump 102 is controlled in response to signal 114 from pressure differential sensor 116 to maintain a desired mass flow rate to condensers 26a and 26b. The speed of pump 108 is controlled in response to signal 126 from pressure differential sensor 128 to maintain a desired mass flow rate through cooling load 94. The speed of pump 106 is controlled in response to signal 122 from pressure differential sensor 124 to maintain a desired mass flow rate through heating load 92. This allows condensers 26a and 26b to heat load 92 as pump 106 circulates fluid 30 between heating load 92 and the two condenser and allows evaporators 28a and 28b to cool load 94 as pump 108 circulates fluid between cooling load 94 and the two evaporators.

To exchange fluid and its sensible heat energy between source 88 and loop 90, pump 100 forces fluid from source 88, through supply line 34, and through directional valve 72 to enter loop segment 40a at point 130. Consequently, a substantially equal amount of fluid, albeit at a different temperature, exits loop segment 40a at a point 132 and returns to source 88 via return line 36. To drive the exchange of fluid between source 88 and loop 90, the speed of pump 100 is controlled in response to signal 96 from temperature sensor 110 to maintain the fluid flowing to condensers 26a and 26b at a predetermined target temperature.

Figure 16:
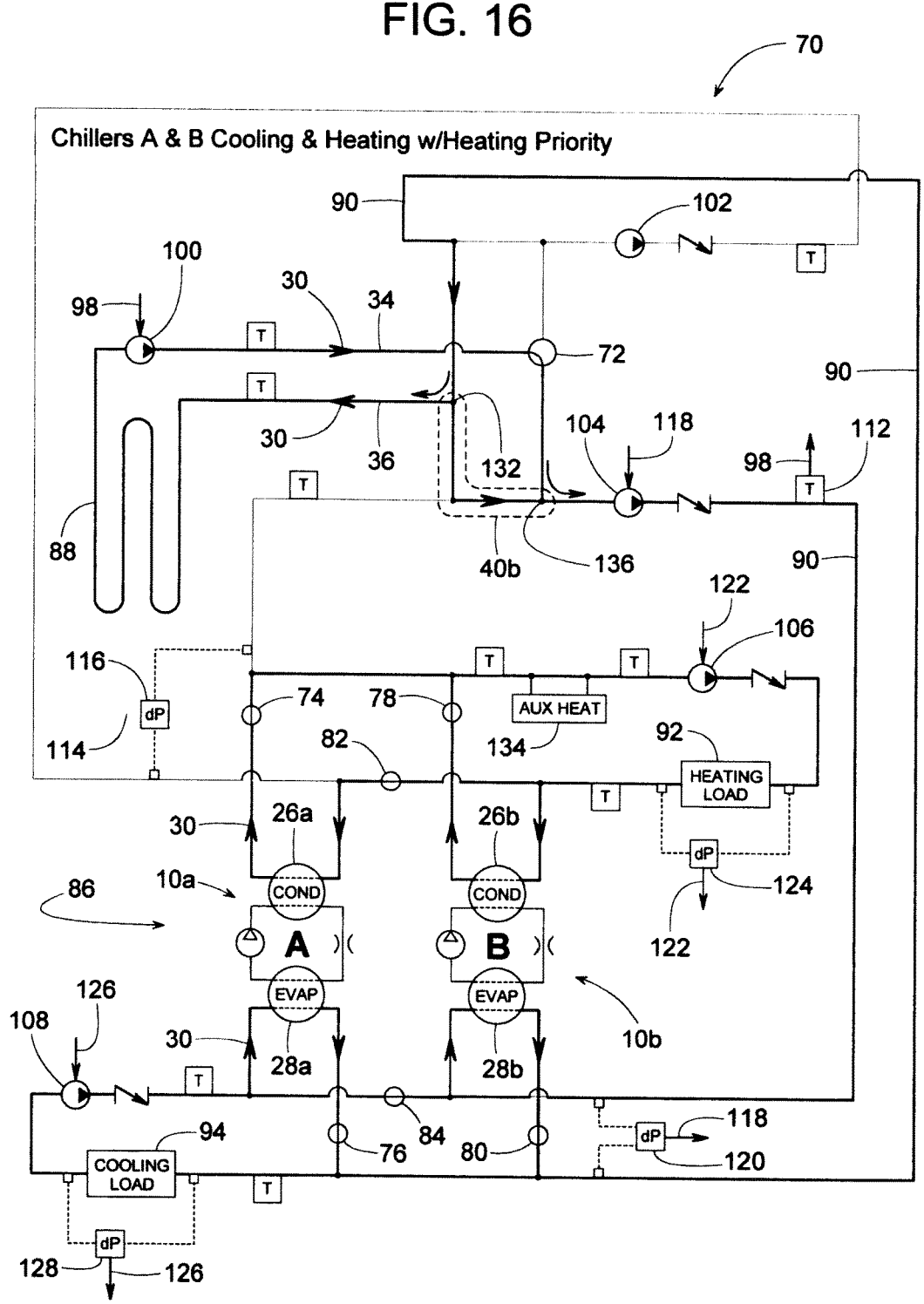
FIG. 16 is a schematic diagram of the heat pump system FIG. 5 but showing the system configured to operate in an "AB/heating-cooling mode" with heating priority.

FIG. 16 shows heat pump system 70 configured in an AB/heating-cooling mode, wherein evaporators 28a and 28b of chillers 10a and 10b both cool load 94 while condensers 26a and 26b of chillers 10a and 10b both heat load 92. To operate in this mode, with the heating of load 92 being a priority, valve 72 is actuated to direct secondary fluid 30 from source 88 to pump 104. Valves 74, 76, 78, 80, 82 and 84 are open, and pump 102 is inactive. The speed of pump 104 is controlled in response to signal 118 from pressure differential sensor 120 to maintain a desired mass flow rate to evaporators 28a and 28b. The speed of pump 108 is controlled in response to signal 126 from pressure differential sensor 128 to maintain a desired mass flow rate through cooling load 94. The speed of pump 106 is controlled in response to signal 122 from pressure differential sensor 124 to maintain a desired mass flow rate through heating load 92. This allows condensers 26a and 26b to heat load 92 as pump 106 circulates fluid 30 between heating load 92 and the two condenser and allows evaporators 28a and 28b to cool load 94 as pump 108 circulates fluid between cooling load 94 and the two evaporators.

To exchange fluid and its sensible heat energy between source 88 and loop 90, pump 100 forces fluid from source 88, through supply line 34, and through directional valve 72 to enter loop segment 40b at point 136. Consequently, a substantially equal amount of fluid, albeit at a different temperature, exits loop segment 40b at point 132 and returns to source 88 via return line 30. To drive the exchange of fluid between source 88 and loop 90, the speed of pump 100 is controlled in response to signal 98 from temperature sensor 112 to maintain the fluid flowing to evaporators 28a and 28b at a predetermined target temperature.

Heat pump system 70 of FIGS. 5-16 is shown comprising one chiller 10a (chiller-A) and one chiller 10b (chiller-B); however, other examples of such a heat pump system have a plurality of chiller-A's and/or a plurality of chiller-B's. In such examples, multiple chiller-A's have their fluid lines connected to place the chiller-A's in parallel flow relationship with each other. The operating modes would still basically be the same as described with reference to FIGS. 5-16, however, one or more chiller-A's could be de-activated to meet the load. Likewise, in heat pump systems having multiple chiller-B's, their fluid lines would be connected to place the chiller-B's in parallel flow relationship with each other. Again, the operating modes would still basically be the same as described with reference to FIGS. 5-16, however, one or more chiller-B's could be de-activated to meet the load.

Although the invention is described with respect to a preferred embodiment, modifications thereto will be apparent to those of ordinary skill in the art. One such modification includes the application of the invention to systems having more than two chillers, including systems with three, four or more chillers. The scope of the invention, therefore, is to be determined by reference to the following claims:

The invention claimed is:

1. A heat pump system operable with a refrigerant, a secondary fluid, a cooling load, and a heating load, the heat pump system comprising:

a chiller-A comprising a condenser-A and an evaporator-A;

a chiller-B comprising a condenser-B and an evaporator-B;

a secondary fluid source, the secondary fluid source being a geothermal fluid source including one or more of a groundwater well, a lake, and a river;

a plurality of valves; and a fluid circulation loop conveying the secondary fluid and interconnecting the chiller-A, the chiller-B, the secondary fluid source, and the plurality of valves, the fluid circulation loop being connectable to the cooling load and the heating load, the plurality of valves being selectively configurable to place the heat pump system in the following modes:

an A/cooling mode to connect the evaporator-A in heat transfer relationship with the cooling load, a B/cooling mode to connect the evaporator-B in heat transfer relationship with the cooling load, an AB/cooling mode to connect the evaporator-A and evaporator-B in heat transfer relationship with the cooling load, an A/heating mode to connect the condenser-A in heat transfer relationship with the heating load and the evaporator-A in heat transfer relationship with the secondary fluid source, wherein the secondary fluid flows sequentially in a single pass from the geothermal fluid source and through evaporator-A, a B/heating mode to connect the condenser-B in heat transfer relationship with the heating load and the evaporator-B in heat transfer relationship with the secondary fluid source, wherein the secondary fluid flows sequentially in a single pass from the geothermal fluid source through evaporator-B, and an AB/heating mode to connect the condenser-A and the condenser-B in heat transfer relationship with the heating load and the evaporator-A and the evaporator-B in heat transfer relationship with the secondary fluid source.

2. The heat pump system of claim 1, wherein the chiller-A and the chiller-B are each part of a unidirectional refrigerant circuit.

3. The heat pump system of claim 1, wherein the chiller-A and the chiller-B each has a separate charge of refrigerant.

4. The heat pump system of claim 1, wherein the plurality of valves are further selectively configurable to place the heat pump system in an A/cooling-B/heating mode to connect the evaporator-A in heat transfer relationship with the cooling load and to connect the condenser-B in heat transfer relationship with the heating load.

5. The heat pump system of claim 1, wherein the plurality of valves are further selectively configurable to place the heat pump system in an A/heating-cooling mode to connect the condenser-A in heat transfer relationship with the heating load and to connect the evaporator-A in heat transfer relationship with the cooling load.

6. The heat pump system of claim 5, wherein the plurality of valves are further selectively configurable to place the heat pump system in a B/heating-cooling mode to connect the condenser-B in heat transfer relationship with the heating load and to connect the evaporator-B in heat transfer relationship with the cooling load.

7. The heat pump system of claim 5, wherein the plurality of valves are further selectively configurable to place the heat pump system in an AB/heating-cooling mode to connect the condenser-A in heat transfer relationship with the heating load, to connect the condenser-B in heat transfer relationship with the heating load, to connect the evaporator-A in heat transfer relationship with the cooling load, and to connect the evaporator-B in heat transfer relationship with the cooling load.

8. The heat pump system of claim 1, wherein the geothermal fluid source includes a substantially closed loop system, wherein the secondary fluid circulates between the geothermal fluid source and the fluid circulation loop.

9. The heat pump system of claim 1, wherein the geothermal fluid source includes an open system, wherein at least some of the secondary fluid circulating between the geothermal fluid source and the fluid circulation loop fails to return to the geothermal fluid source.

10. The heat pump system of claim 1, wherein the heating load is separate from the cooling load.

11. The heat pump system of claim 1, wherein the secondary fluid source is fluidly separated from the cooling load and the heating load.

12. The heat pump system of claim 1, wherein the secondary fluid source is selectively connectable to the cooling load.

* * * * *